(12) United States Patent
Snow et al.

(10) Patent No.: US 8,873,618 B2
(45) Date of Patent: Oct. 28, 2014

(54) DEVICE TO TRANSMIT DATA BY DISPLAYING A CODED IMAGE GENERATED ACCORDING TO A SELECTABLE ENCODING SCHEME AND ASSOCIATED METHODS

(75) Inventors: Christopher Harris Snow, Kitchener (CA); Robert George Oliver, Owen Sound (CA); Anand Ravindra Oka, Waterloo (CA); Nazih Almalki, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 373 days.

(21) Appl. No.: 13/036,248

(22) Filed: Feb. 28, 2011

(65) Prior Publication Data

US 2012/0219053 A1 Aug. 30, 2012

(51) Int. Cl.
| | |
|---|---|
| H04B 1/66 | (2006.01) |
| H04N 21/4223 | (2011.01) |
| H04N 19/12 | (2014.01) |
| H04N 21/442 | (2011.01) |
| H04N 21/6379 | (2011.01) |
| H04N 21/41 | (2011.01) |
| H04N 21/4363 | (2011.01) |
| H04N 7/14 | (2006.01) |

(52) U.S. Cl.
CPC ..... *H04N 19/00078* (2013.01); *H04N 21/4223* (2013.01); *H04N 7/141* (2013.01); *H04N 21/4424* (2013.01); *H04N 21/6379* (2013.01); *H04N 21/4126* (2013.01); *H04N 21/43637* (2013.01)
USPC .......................................................... 375/240

(58) Field of Classification Search
CPC .................... H04N 19/00078; H04N 21/4126; H04N 21/4233; G11B 20/1833; H03M 13/1515
USPC .......................................................... 375/240
See application file for complete search history.

(56) References Cited

U.S. PATENT DOCUMENTS

| | | | |
|---|---|---|---|
| 6,512,918 B1 * | 1/2003 | Malomsoky et al. | 455/403 |
| 7,224,370 B1 | 5/2007 | Ye | 345/581 |

(Continued)

FOREIGN PATENT DOCUMENTS

| | | | |
|---|---|---|---|
| WO | WO 2007/045937 | 4/2007 | H04L 12/22 |
| WO | WO 2009/032522 | 3/2009 | H04B 10/10 |

OTHER PUBLICATIONS

Claycomb et al: "Using a Two Dimensional Colorized Barcode Solution for Authentication in Pervasive Computing", 2006 ACS/IEEE International Conference on Pervasive Services Jun. 26-29, 2006, Piscataway, NJ, USA, Jan. 1, 2006, pp. 173-180.

(Continued)

*Primary Examiner* — Sath V Perungavoor
*Assistant Examiner* — Peter D Le
(74) *Attorney, Agent, or Firm* — Allen, Dyer, Doppelt, Milbrath & Gilchrist, P.A.

(57) ABSTRACT

A communications system includes a first device with a first display, and a first processor configured to generate at least one coded image according to a selectable encoding scheme from among different encoding schemes, and display the coded image on the first display. A first communications device is coupled to the first processor. A second device includes a second camera configured to capture the coded image on the first display, a second communications device, and a second processor coupled to the second camera and the second communications device. The second processor is configured to send a status message, via the second and first communications devices to the first processor, related to whether the captured coded image is decodable based upon a currently selected encoding scheme.

20 Claims, 6 Drawing Sheets

(56) References Cited

U.S. PATENT DOCUMENTS

| | | | |
|---|---|---|---|
| 7,379,921 B1* | 5/2008 | Kiliccote | 705/75 |
| 7,543,748 B2 | 6/2009 | Kiliccote | 235/462.1 |
| 8,041,335 B2* | 10/2011 | Khetawat et al. | 455/404.2 |
| 8,332,323 B2* | 12/2012 | Stals et al. | 705/44 |
| 2003/0135860 A1* | 7/2003 | Dureau | 725/82 |
| 2003/0187936 A1* | 10/2003 | Bodin et al. | 709/206 |
| 2003/0230630 A1* | 12/2003 | Whipple et al. | 235/462.01 |
| 2004/0236818 A1* | 11/2004 | Bantz et al. | 709/200 |
| 2005/0091696 A1* | 4/2005 | Wolfe et al. | 725/116 |
| 2005/0175099 A1* | 8/2005 | Sarkijarvi et al. | 375/240.16 |
| 2006/0048193 A1* | 3/2006 | Jacobs et al. | 725/81 |
| 2006/0088166 A1* | 4/2006 | Karusawa | 380/277 |
| 2006/0124744 A1* | 6/2006 | Gormish et al. | 235/462.08 |
| 2006/0242325 A1* | 10/2006 | Ramaswamy et al. | 709/246 |
| 2006/0274369 A1* | 12/2006 | Yamamoto | 358/1.15 |
| 2007/0112826 A1* | 5/2007 | Laksono | 707/102 |
| 2007/0195743 A1* | 8/2007 | Karaoguz | 370/338 |
| 2008/0043834 A1* | 2/2008 | Lesser et al. | 375/240 |
| 2008/0048044 A1* | 2/2008 | Zhao et al. | 235/494 |
| 2008/0120667 A1* | 5/2008 | Zaltsman | 725/110 |
| 2008/0185438 A1* | 8/2008 | Pinchen et al. | 235/462.01 |
| 2008/0244381 A1* | 10/2008 | Nicolaou et al. | 715/234 |
| 2011/0016231 A1* | 1/2011 | Ramaswamy et al. | 709/246 |
| 2012/0197805 A1* | 8/2012 | Chung | 705/64 |

OTHER PUBLICATIONS

Noriyasu Yamamoto et al: "A User Attestation System Using a Cellular Phone Equipped With Digital Camera", P2P, Parallel, Grid, Cloud and Internet Computing (3PGCIC), 2010 International Conference on, IEEE, Piscataway, NJ, USA, Nov. 4, 2010, pp. 431-435.

McCune et al: "Seeing-Is-Believing: Using Camera Phones for Human-Verifiable Authentication", Security and Privacy, 2005 IEEE Symposium on Oakland, CA, USA May 8-11, 2005, Piscataway, NJ, USA, May 8, 2005, pp. 110-124.

Langlotz et al., "Unsynchronized 4D barcodes-Coding and decoding time-multiplexed 2D colorcodes", Bauhaus-University Weimar, no date available, pp. 1-12.

"QR code Readers-Best QU Code Readers", Cellphone-barcode. com, 2009, pp. 1-3.

Perli et al., "LCD-Camera pairs as communication links" SIGCOMM, Aug. 2010, pp. 451-452.

"Barcode file transfer", OLPC Foundation, Mar. 2007, http://wiki.laptop.org/go/barcode_file_transfer, pp. 1-7.

Tripletail Ventures, Inc. "Data without boundaries", www.tripletailventures.com, 2006, pp. 1-5.

* cited by examiner

DEVICE TO TRANSMIT DATA BY DISPLAYING A CODED IMAGE GENERATED ACCORDING TO A SELECTABLE ENCODING SCHEME AND ASSOCIATED METHODS

TECHNICAL FIELD

The present disclosure relates to the field of data transmission, and, more particularly, to data transmission via the display of a coded image.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices also allow users to send and receive electronic mail (email) messages wirelessly and access the Internet via a cellular network and/or a wireless local area network (WLAN), for example. In addition, these devices may allow users to send Short Messaging Service (SMS) messages, Personal Identification Number (PIN) messages, and instant messages. Furthermore, these devices may allow the storage of data of all types.

Given the amount of information now stored on a mobile device itself, and the prevalence of mobile devices, it may be desirable to wirelessly transfer an item of data from one mobile device to another mobile device. Such a transfer may be performed over a wide area network that both mobile devices are connected to, such as the Internet.

Consequently, the development of new secure methods of wirelessly transmitting data is desirable.

DETAILED DESCRIPTION

Figure 1:
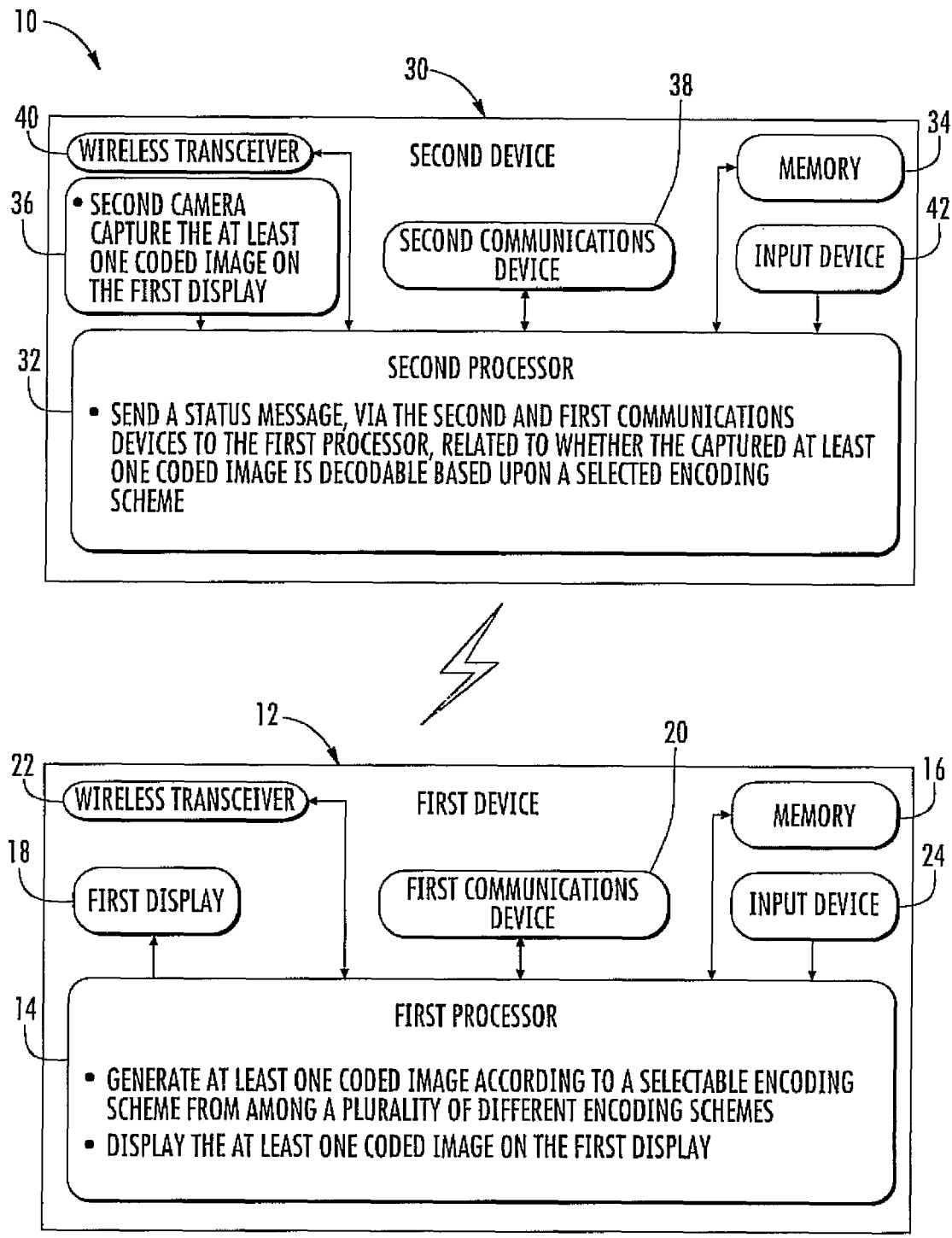
FIG. 1 is a schematic block diagram of an embodiment of a communications system in accordance with the present disclosure.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime and multiple prime notation is used to indicate similar elements or steps in alternative embodiments.

Generally speaking, a communications system may include a first device having a first display and a first processor. The first processor may be configured to generate at least one coded image according to a selectable encoding scheme from among a plurality of different encoding schemes, and display the at least one coded image on the first display. A first communications device may be coupled to the first processor.

The communications system may also include a second device which may have a second camera configured to capture the at least one coded image on the first display, and a second communications device. A second processor may be coupled to the second camera and the second communications device and may be configured to send a status message, via the second and first communications devices to the first processor, related to whether the captured at least one coded image is decodable based upon a currently selected encoding scheme.

This communications system provides data transmission with security. Since the transmission of data is via a line of sight, a secure location in which to perform the transfer may be chosen, without worry that a nearby infiltrator could intercept the data.

The first processor may be configured to select a new encoding scheme based upon the status message. Therefore, in some cases, the first processor may be configured to select the new encoding scheme with a higher data density than the currently selected encoding scheme. In other cases, the first processor may be configured to select the new encoding scheme with a lower data density than the currently selected encoding scheme.

The status message may comprise a desired encoding scheme from among the plurality of different encoding schemes, and the first processor may be configured to select the desired encoding scheme based upon the status message. At least one of the plurality of different encoding schemes may comprise a repeating encoding scheme. Further, the at least one coded image may comprise a series of coded images.

In some applications, the first communications device and the second communications device may comprise first and second Bluetooth devices, respectively. In other applications, the second communications device may comprise a second display, and the second processor may be configured to display a status image representing the status message on the second display. In this case, the first communications device may comprise a first camera configured to capture the status image.

Alternatively, the second communications device may comprise an optical source, and the first communications device may comprise an optical detector. At least one of the first and second communications devices may comprise a mobile wireless communications device.

A method aspect may be directed to a communications method that may include generating at least one coded image according to a selectable encoding scheme from among a plurality of different encoding schemes, using a first processor of a first device, and displaying the at least one coded image on a first display of the first device. The communications method may also include capturing the at least one coded image on the first display, using a second camera of a second device. The communications method may further include sending a status message to the first processor, via a second communications device of the second device and a first communications device of the first device, related to whether the captured at least one coded image is decodable based upon a currently selected encoding scheme, using a second processor of the second device.

Referring initially to FIG. 1, a communications system 10 is now described. The communications system 10 includes a first device 12 and a second device 30. The first device 12 includes a first processor 14 coupled to a memory 16, a first display 18, a first communications device 20, a wireless transceiver 22, and an input device 24.

The input device 24 may be a keyboard, touch sensitive pad, trackball, thumbwheel, button, microphone, or other suitable device, for example. It should be appreciated that in some applications, the first display 18 may be a touch sensitive display, and may therefore serve as, or supplement, the input device 24. In addition, the wireless transceiver 22 may be a cellular transceiver, and may be configured to perform both voice and data cellular communications.

The memory 16 may include volatile and non-volatile portions, and is configured to store data to be transferred to the second device 30. The first processor 14 is configured to generate at least one coded image according to a selectable encoding scheme from among a plurality of different encoding schemes, and representing at least a portion of the data to be transferred to the second device 30. The first processor 14 is also configured to display the at least one coded image on the first display 18. The different encoding schemes may result in the coded image being a QR coded or barcode, although the coded image may also be another type of coded image, as will be appreciated by those of skill in the art.

The second device 30 includes a second processor 32 coupled to a memory 34, a second camera 36, a second communications device 38, a wireless transceiver 40, and an input device 42. The input device 42 may be a keyboard, touch sensitive pad, trackball, thumbwheel, button, microphone, or other suitable device, for example. In addition, the wireless transceiver 40 may be a cellular transceiver, and may be configured to perform both voice and data cellular communications. The memory 34 may include volatile and non-volatile portions.

The second camera 36 is configured to capture the at least one coded image as the at least one coded image is displayed on the first display 18. The second processor 32 is configured to generate a status message related to whether the captured coded image is decodable based upon a selected encoding scheme, and to send the stats message to the first device 12 via the second communications device 38 and the first communications device 20.

The status message may contain a variety of information. For example, the status message may merely state whether the coded image was able to be decoded or not, or may state whether the second camera 36 was able to capture any image at all. The status message may even state that the coded image was unable to be decoded because the second camera 36 was only able to capture a portion thereof, or that the coded image was able to be decoded even though the second camera was only able to capture a portion thereof, as will be appreciated by the skilled artisan.

This status message provides the first device 12 with feedback as to whether the presented coded image was able to be decoded by the second processor 32. An image may not be able to be decoded for a variety of reasons. For example, the second processor 32 may not be configured to decode that type of coded image, or the second camera 36 may not have been able to capture the coded image properly (e.g. because the first device 12 and second device 30 were not properly aligned, because of relative motion between the first and second devices, because there was an obstruction in the line of sight between the second camera 36 and the first display 18, etc).

By using this status message as feedback, the first processor 14 may then encode a next coded image according to a different encoding scheme, as will be explained in detail below, or may provide notice to a user that the transmission is not proceeding properly. For example, the second processor 32 may not be configured to decode images encoded with all of the different encoding schemes with which the first processor 14 is configured to encode images. Therefore, the first processor 14 may sequentially send coded images coded according to different encoding schemes until the second processor 32 is able to decode one of the coded images. Alternatively, the first processor 14 may send a new coded image encoded according to an encoding scheme selected via the input device 24.

This communications system 10 provides increased security over other methods of data transmission because the transmission of data is along a line of sight path, and not via an interceptable radius of radio transmission, such as with cellular, Bluetooth, or WiFi communications. Users of the first device 12 and second device 30 can ensure that the transmission takes place in a secure setting, where the line of sight between the first and second devices is private, and not publicly viewable, further enhancing the security of data transmission using the communications system 10.

Figure 2:
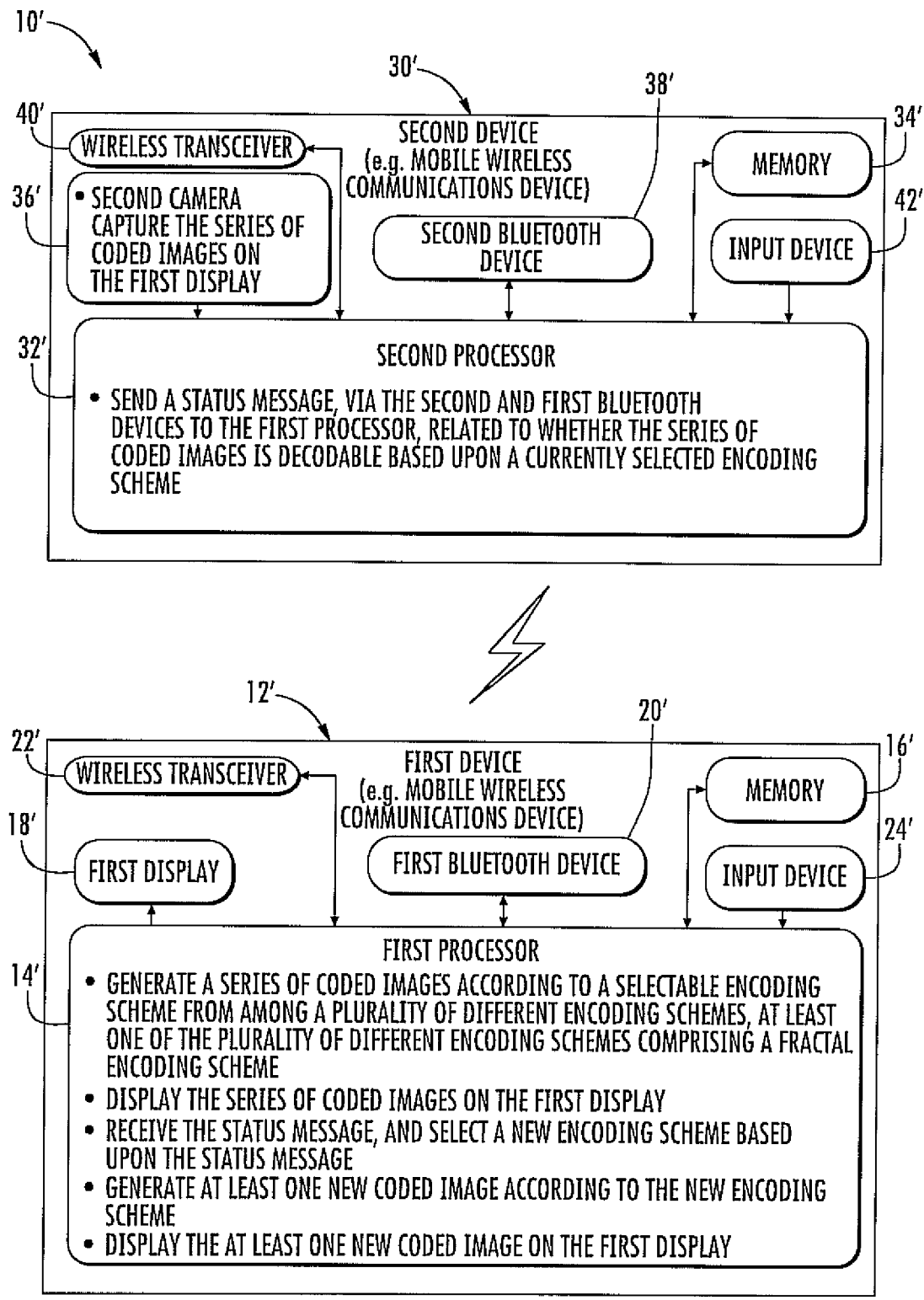
FIG. 2 is a schematic block diagram of an additional embodiment of a communications system in accordance with the present disclosure.

An additional embodiment of the communications system 10' is now described with reference to FIG. 2. Portions of the communications system 10' not specifically described are similar to those of the communications system 10 described above with reference to FIG. 1. In the embodiment shown in FIG. 2, the first device 12' is a mobile wireless communications device as is the second device 30'. It should, however, be appreciated that only one of the first and second devices 12', 30' may be mobile wireless communications devices in some applications. Example mobile wireless communications devices 12', 30' may include portable or personal media players (e.g., music or MP3 players, video players, etc.), remote controls (e.g., television or stereo remotes, etc.), portable gaming devices, portable or mobile telephones, smartphones, tablet computers, etc.

It should be appreciated that the first and second mobile wireless communications device 12', 30' may each have different configurations, or may have similar configurations. For example, the first display 18' may be on a face of the first mobile wireless communications device 12', but the second camera 36' may be on the back of the second mobile wireless communications device. Alternatively, the second camera 36' may be on the front of the second mobile wireless communications device, above an optional second display.

In this embodiment, the first processor 14' generates a series of coded images that encode a selected unit of data. That is, multiple coded images are generated and sequentially displayed, such that the entire selected unit of data is sent.

In addition, here, at least one of the plurality of different encoding schemes used by the first processor 14' comprises a repeating encoding scheme. The use of a repeating encoding scheme for the coded image may be particularly useful in some applications where the second camera 36' can view only a portion of the first display 18', as different portions of the coded image may encode the same data. In such an application, merely capturing a portion of the coded image may be sufficient for decoding and thus recovery of the transmitted data.

Further, in this embodiment, the first communications device 20' is a first Bluetooth device and the second communications device 38' is a second Bluetooth device. After the first processor 14' receives the status message, the second first processor 14' is configured to select a new encoding scheme based upon the status message. The first processor 14' then generates at least one new coded image according to the new encoding scheme, and displays the at least one new coded image on the first display 18'. It should be understood that the new coded image may include at least a portion of the data contained in the previous coded image, and may therefore be a re-sending of at least some of the same data encoded differently, should the status message indicate that the previous coded image was not able to be decoded. Conversely, the new coded image may include different data, and may therefore be at least part of a remaining portion of untransmitted data encoded differently, should the status message indicate that the previous coded image was indeed properly decoded. Also, the first processor 14' may adjust a speed of the display of the series of coded images based upon the status message.

A further embodiment of the communications system 10" is now described with reference to FIG. 3. Portions of the communications system 10" not specifically described are similar to those of the communications system 10 described above with reference to FIG. 1.

Figure 3:
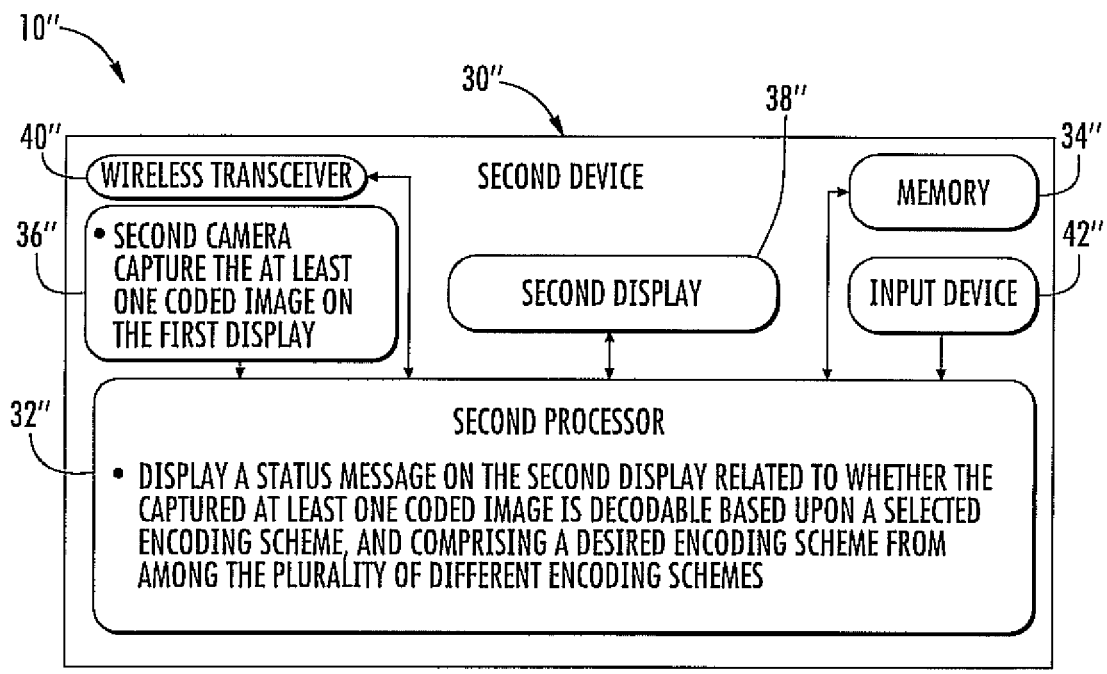
FIG. 3 is a schematic block diagram of a further embodiment of a communications system in accordance with the present disclosure.
Figure 3:
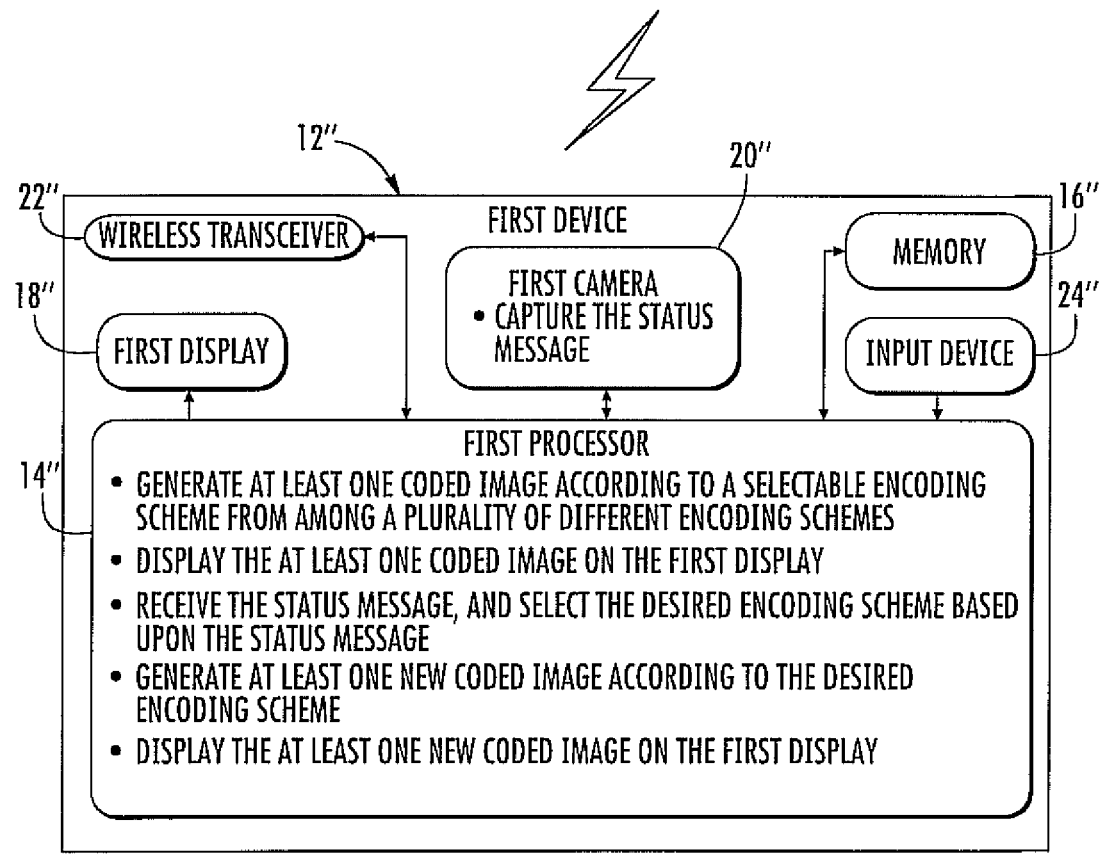

In the embodiment shown in FIG. 3, the first communications device 20" is a first camera and the second communications device 38" is a second display. Therefore, the second processor 32" generates the status message based upon whether the captured coded image is decodable, and displays the status message on the second display 38". The first camera 20" then captures the status message, which is in turn read by the first processor 14". The status message may be a coded status message image in some applications. For example, if the captured coded image was decodable, the status message may be encoded as an image according to a same encoding scheme as the captured coded image. This embodiment may be considered to be particularly secure, as the only communications between the first device 12" and second device 30" are line of sight communications.

The status message in this embodiment may indicate a desired encoding scheme from among the plurality of different encoding schemes. For example, the second processor 32" may have been unable to decode the captured coded image because the second processor 32" was not configured to decode images coded according to the current encoding scheme, and may therefore request an encoding scheme in the status message that the second processor 32" is configured to decode. Alternatively, the second processor camera 36" may have been able to capture only a portion of the coded image, and the second processor 32" may therefore request in the status message that the first processor 14" use a repeating encoding scheme. The first processor 14" then generated at least one new coded image according to the desired encoding scheme, and displays the at least new coded image on the first display 18".

Figure 4:
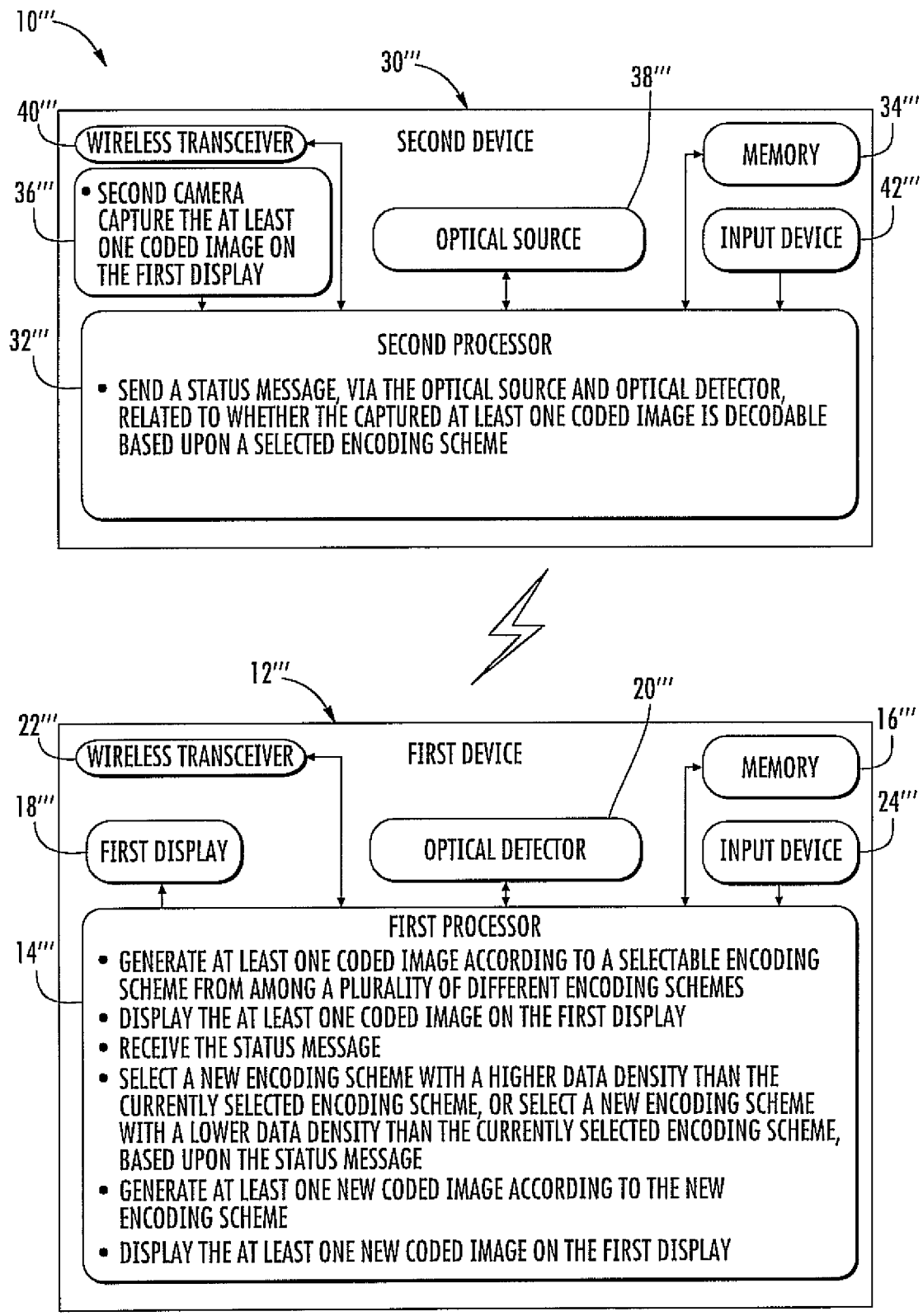
FIG. 4 is a schematic block diagram of yet another embodiment of a communications system in accordance with the present disclosure.

Yet another embodiment of a communications system 10''' is now described with reference to FIG. 4. Portions of the communications system 10''' not specifically described are similar to those of the communications system 10 described above with reference to FIG. 1.

Here, the first communications device 20''' is an optical detector, and the second communications device 38''' is an optical source. After receiving the status message, the first processor 14''' may select a new encoding scheme with a higher data density than the currently selected encoding scheme (that is, the encoding scheme used to encode the coded image that the status message is related to), or may select a new encoding scheme with a lower data density than the currently selected encoding scheme. Those skilled in the art will understand that data density refers to the amount of data encoded into each coded image, and that different encoding schemes produce coded images that encode different amounts of data.

Therefore, if the status message indicates that the second processor 32''' was able to decode the coded message, the first processor 14''' may encode a new coded image according to a new encoding scheme that has a higher data density to thereby increase the speed of the data transfer. Similarly, if the status message indicates that the second processor 32''' was unable to decode the coded image, the first processor 14''' may encode a new coded image according to a new encoding scheme that has a lower data density thereby slow the speed of the data transfer, in the hope that the second processor 32''' is able to decode the new coded image. The first processor 14''' then generates at least one new coded image according to the new encoding scheme, and displays the at least one new coded image on the first display 18'''. Since the encoding scheme may, in some instances, change between each coded image, the speed of the data transfer may be dynamically adjusted, so as to provide the quickest data transfer available under changing conditions.

Figure 5:
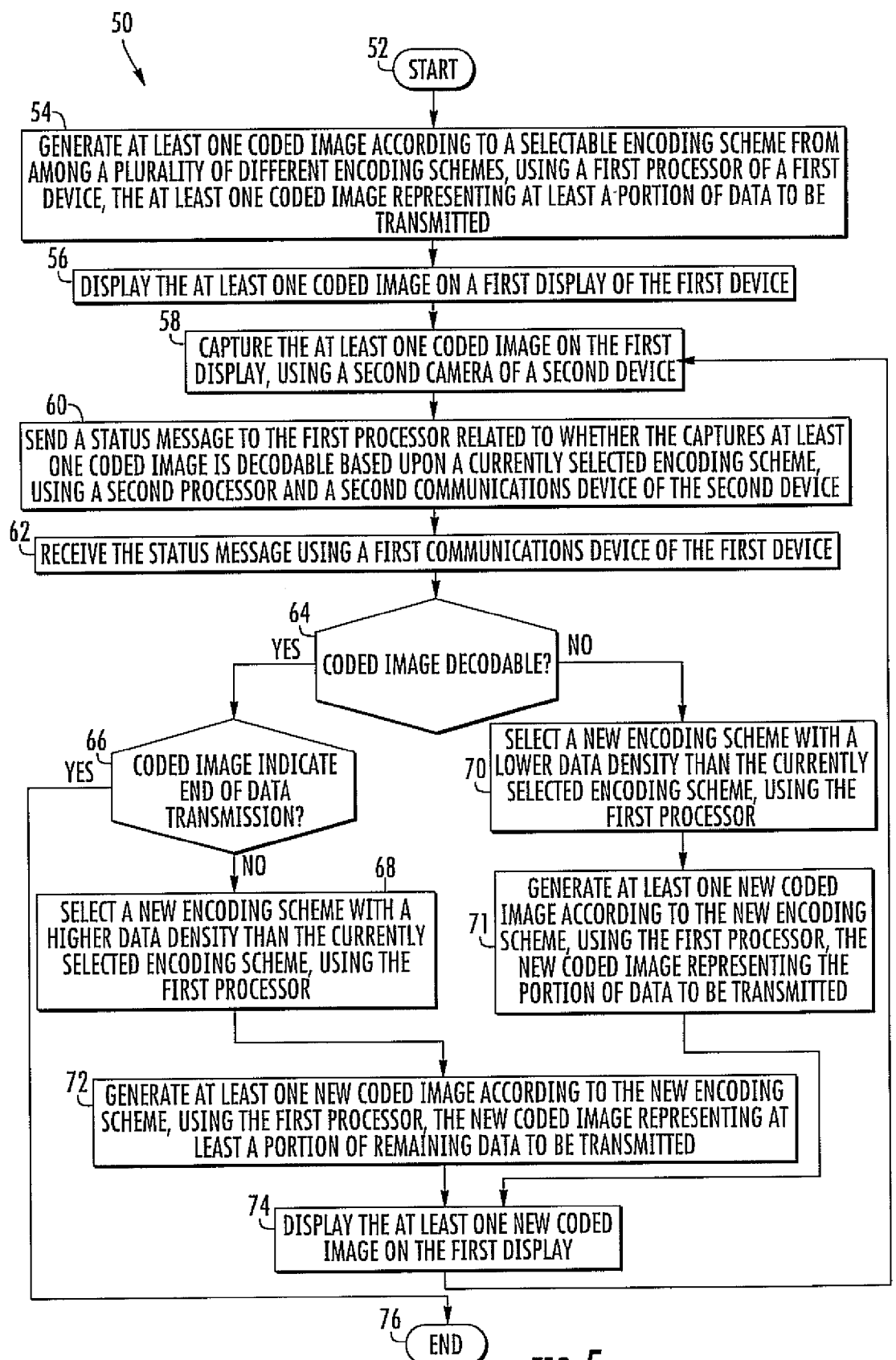
FIG. 5 is a flowchart of a communications method in accordance with the present disclosure.

A method of operating a communications system is now described with reference to the flowchart 50 of FIG. 5. After the start (Block 52), at least one coded image is generated according to a selectable encoding scheme from among a plurality of different encoding schemes, using a first processor of a first device, the at least one coded image representing at least a portion of data to be transmitted (Block 54). The at least one coded image is then displayed on a first display of the first device (Block 56).

The at least one coded image on the first display is captured, using a second camera of a second device (Block 58). Next, a status message is sent to the first processor and is related to whether the captured at least one coded image is decodable based upon a currently selected encoding scheme, using a second processor and a second communications device of the second device (Block 60).

The status message is received using a first communications device of the first device (Block 62). At Block 64, if the coded image is not decodable, the method progresses to Block 70, where a new encoding scheme with a lower data density than the currently selected encoding scheme is selected, using the processor. Then, a new coded image is generated according to the new encoding scheme, using the first processor, the new coded image representing the initial portion of data to be transferred (Block 71). The at least one new coded image is then displayed on the first display (Block 74). The method then returns to Block 58, and proceeds from there as described above.

If, at Block 64, the coded image is decodable, and, at Block 66, the coded image indicates an end of data transmission, the method ends at Block 76. If the coded image is decodable, but the coded image does not indicate an end of data transmission, a new encoding scheme with a higher data density than the currently selected encoding scheme is selected, using the first processor, at Block 68. Then, at least one new coded image is generated according to the new encoding scheme, using the first processor, the new coded image representing at least a portion of remaining data to be transmitted (Block 72). The at least one new coded image is then displayed on the first display (Block 74). The method then returns to Block 58, and proceeds from there as described above.

Example components of a mobile wireless communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
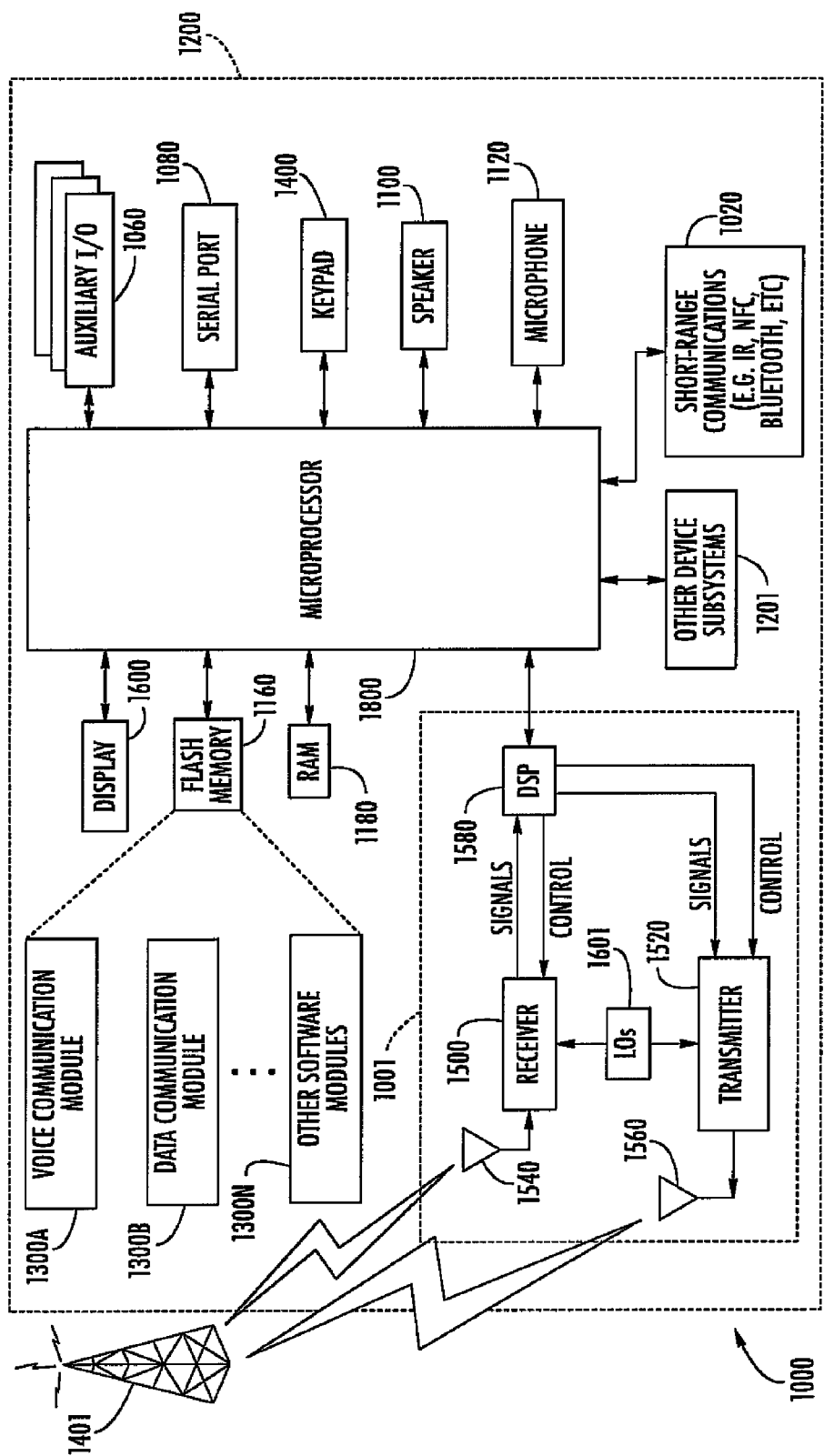
FIG. 6 is a schematic block diagram illustrating example components of a mobile wireless communications device that may be used with the communications systems of FIGS. 1, 2, 3, and 4.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to processing device's 1800 operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
a first device comprising
a first display,
a first processor configured to generate at least one optically machine-readable coded image according to a selectable encoding scheme from among a plurality of different encoding schemes, and display the at least one optically machine-readable coded image on said first display,
a first communications device coupled to said first processor; and
a second device comprising
a second camera configured to capture the at least one optically machine-readable coded image on said first display,
a second communications device, and
a second processor coupled to said second camera and said second communications device and configured to send a status message, via said second and first communications devices to said first processor, related to whether the captured at least one optically machine-readable coded image is decodable based upon a currently selected encoding scheme;
said first processor being configured to
select a new encoding scheme based upon the status message, and
display at least one new optically machine-readable coded image according to the new encoding scheme on the first display,
the at least one new optically machine-readable coded image including data from the at least one optically machine-readable coded image being resent if the status message indicates that the captured at least one optically machine-readable coded image is not decodable.

2. The communications system of claim 1, where said first processor is configured to select the new encoding scheme with a higher data density than the currently selected encoding scheme.

3. The communications system of claim 1, where said first processor is configured to select the new encoding scheme with a lower data density than the currently selected encoding scheme.

4. The communications system of claim 1, wherein the status message comprises a desired encoding scheme from among the plurality of different encoding schemes; and wherein said first processor is configured to select the desired encoding scheme based upon the status message.

5. The communications system of claim 1, wherein the at least one optically machine-readable coded image comprises a series of optically machine-readable coded images.

6. The communications system of claim 1, wherein said first communications device and said second communications device comprise first and second Bluetooth devices, respectively.

7. The communications system of claim 1, wherein said second communications device comprises a second display; wherein said second processor is configured to display a status image representing the status message on said second display; and wherein said first communications device comprises a first camera configured to capture the status image.

8. The communications system of claim 1, wherein said second communications device comprises an optical source; and wherein said first communications device comprises an optical detector.

9. A communications system comprising:
a first mobile wireless communications device comprising
a first display,
a first processor configured to generate at least one optically machine-readable coded image according to a selectable encoding scheme from among a plurality of different encoding schemes, and display the at least one optically machine-readable coded image on said first display,
a first communications device coupled to said first processor; and
a second mobile wireless communications device comprising
a second camera configured to capture the at least one optically machine-readable coded image on said first display,
a second communications device, and
a second processor coupled to said second camera and said second communications device and configured to send a status message, via said second and first communications devices to said first processor, related to whether the captured at least one optically machine-readable coded image is decodable based upon a currently selected encoding scheme;
said first processor also configured to
select a new encoding scheme based upon the status message, and
display at least one new optically machine-readable coded image according to the new encoding scheme on the first display,
the at least one new optically machine-readable coded image including data from the at least one optically machine-readable coded image being resent if the status message indicates that the captured at least one optically machine-readable coded image is not decodable.

10. The communications system of claim 9, where said first processor is configured to select the new encoding scheme with a higher data density than the currently selected encoding scheme.

11. The communications system of claim 9, where said first processor is configured to select the new encoding scheme with a lower data density than the currently selected encoding scheme.

12. The communications system of claim 9, wherein said first communications device and said second communications device comprise first and second Bluetooth devices, respectively.

13. The communications system of claim 9, wherein said second communications device comprises a second display; wherein said second processor is configured to display a status image representing the status message on said second display; and wherein said first communications device comprises a first camera configured to capture the status image.

14. A communications method comprising:
generating at least one optically machine-readable coded image according to a selectable encoding scheme from among a plurality of different encoding schemes, using a first processor of a first device, and displaying the at least one optically machine-readable coded image on a first display of the first device;

capturing the at least one optically machine-readable coded image on the first display, using a second camera of a second device;

sending a status message to the first processor, via a second communications device of the second device and a first communications device of the first device, related to whether the captured at least one optically machine-readable coded image is decodable based upon a currently selected encoding scheme, using a second processor of the second device;

selecting a new encoding scheme based upon the status message using the first processor; and resending data for at least one new optically machine-readable coded image to be displayed on the first display according to the new encoding scheme if the status message indicates that the captured at least one optically machine-readable coded image is not decodable.

15. The communications method of claim 14, wherein the new encoding scheme is selected to have a higher data density than the currently selected encoding scheme.

16. The communications method of claim 14, wherein the new encoding scheme is selected to have a lower data density than the currently selected encoding scheme.

17. The communications method of claim 14, wherein the status message comprises a desired encoding scheme from among the plurality of different encoding schemes; further comprising selecting the desired encoding scheme based upon the status message, using the first processor.

18. The communications system of claim 1, wherein the data from the at least one optically machine-readable coded image is communicated only optically between the first and second devices.

19. The communications system of claim 9, wherein the data from the at least one optically machine-readable coded image is communicated only optically between the first and second devices.

20. The communications method according to claim 14, wherein the data for the at least one optically machine-readable coded image is communicated only optically between the first and second devices.

\* \* \* \* \*